United States Patent
Ramalingam et al.

(10) Patent No.: US 9,723,487 B2
(45) Date of Patent: Aug. 1, 2017

(54) MOBILE DEVICE SECURITY SYSTEM

(71) Applicant: AMERICAN MEGATRENDS, INC., Norcross, GA (US)

(72) Inventors: Muthukkumaran Ramalingam, Chennai (IN); Santhosh Samuel Mathews, Chennai (IN); Joseprabu Inbaraj, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 32 days.

(21) Appl. No.: 13/970,112

(22) Filed: Aug. 19, 2013

(65) Prior Publication Data
US 2015/0050922 A1    Feb. 19, 2015

(51) Int. Cl.
| | |
|---|---|
| H04W 12/08 | (2009.01) |
| H04W 4/00 | (2009.01) |
| H04W 4/02 | (2009.01) |
| H04M 1/725 | (2006.01) |
| H04L 29/06 | (2006.01) |

(52) U.S. Cl.
CPC .......... *H04W 12/08* (2013.01); *H04L 63/101* (2013.01); *H04L 63/105* (2013.01); *H04L 63/107* (2013.01); *H04M 1/72572* (2013.01); *H04M 1/72577* (2013.01); *H04W 4/001* (2013.01); *H04W 4/021* (2013.01)

(58) Field of Classification Search
CPC .................................................. H04W 12/08
See application file for complete search history.

(56) References Cited

U.S. PATENT DOCUMENTS

| | | | | |
|---|---|---|---|---|
| 7,769,394 | B1* | 8/2010 | Zhu ................... | H04M 1/72572 455/456.1 |
| 2005/0260973 | A1* | 11/2005 | van de Groenendaal | .... 455/411 |
| 2007/0088948 | A1* | 4/2007 | Ji et al. ................... | 713/166 |

(Continued)

OTHER PUBLICATIONS

"How Spy Tech Firms Let Governments See Everything on a Smartphone," by Nicole Perlroth, New York Times, Sep. 2, 2016 and available at http://www.nytimes.com/2016/09/03/technology/nso-group-how-spy-tech-firms-let-governments-see-everything-on-a-smartphone.html.*

*Primary Examiner* — Magdi Elhag
*Assistant Examiner* — David Orange
(74) *Attorney, Agent, or Firm* — Locke Lord LLP; Tim Tingkang Xia, Esq.

(57) ABSTRACT

A location based mobile device security enforcement system includes: (a) a mobile device management (MDM) server, (b) a security control module, (c) an entry point security system, and (d) a mobile device security application, when installed and executed on a mobile device, configured to register the mobile device and its user to create a mobile device user profile for the mobile device user, when the mobile device and its user enter a secure area, authenticate the mobile device user, maintain constant contact with security control module, and make security adjustments to the mobile device if contact between mobile device and security control module is lost, mobile device security application becomes non-operational, current time is beyond the mobile device user authorized access time period, and current mobile device location is outside of mobile device user authorized access area or crosses borders between one area security level to another area security level.

16 Claims, 3 Drawing Sheets

| USER DESIGNATION | AREA DESIGNATION | NETWORK (WI-FI) FUNCTION | PHONE FUNCTION | CAMERA FUNCTION | VOICE RECORDING FUNCTION |
|---|---|---|---|---|---|
| LOW | GREEN | YES | YES | YES | YES |
| MEDIUM | GREEN | YES | YES | YES | YES |
| HIGH | GREEN | YES | YES | YES | YES |
| LOW | ORANGE | YES | YES | NO | NO |
| MEDIUM | ORANGE | YES | YES | YES | YES |
| HIGH | ORANGE | YES | YES | YES | YES |
| LOW | RED | YES | NO | NO | NO |
| MEDIUM | RED | YES | YES | NO | NO |
| HIGH | RED | YES | YES | YES | YES |

(56) References Cited

U.S. PATENT DOCUMENTS

| | | | |
|---|---|---|---|
| 2008/0096608 A1* | 4/2008 | Wendling | 455/558 |
| 2009/0044259 A1* | 2/2009 | Bookman et al. | 726/5 |
| 2009/0049518 A1* | 2/2009 | Roman et al. | 726/1 |
| 2009/0061890 A1* | 3/2009 | Andreasson et al. | 455/456.1 |
| 2009/0068984 A1* | 3/2009 | Burnett | 455/408 |
| 2009/0248828 A1* | 10/2009 | Gould et al. | 709/207 |
| 2011/0009107 A1* | 1/2011 | Guba et al. | 455/418 |
| 2011/0092245 A1* | 4/2011 | Noonan et al. | 455/528 |
| 2013/0007245 A1* | 1/2013 | Malik et al. | 709/223 |
| 2014/0018059 A1* | 1/2014 | Noonan | 455/419 |
| 2014/0157353 A1* | 6/2014 | Shim | H04L 63/20 726/1 |

* cited by examiner

| USER DESIGNATION | AREA DESIGNATION | NETWORK (WI-FI) FUNCTION | PHONE FUNCTION | CAMERA FUNCTION | VOICE RECORDING FUNCTION |
|---|---|---|---|---|---|
| LOW | GREEN | YES | YES | YES | YES |
| MEDIUM | GREEN | YES | YES | YES | YES |
| HIGH | GREEN | YES | YES | YES | YES |
| LOW | ORANGE | YES | YES | NO | NO |
| MEDIUM | ORANGE | YES | YES | YES | YES |
| HIGH | ORANGE | YES | NO | YES | YES |
| LOW | RED | YES | YES | NO | NO |
| MEDIUM | RED | YES | YES | NO | NO |
| HIGH | RED | YES | YES | YES | YES |

FIG. 2

MOBILE DEVICE SECURITY SYSTEM

FIELD

The present disclosure generally relates to enterprise security, and more particularly to a location based mobile device security enforcement system.

BACKGROUND

Modern technology makes the mobile devices such as mobile phone, smart phones, table computers and laptop computers very popular. Typically, these mobile devices are equipped with information capturing capabilities such cameras for image and video recording, and microphones for voice recording, and information transmission capability such as network connection. These information capturing and transmission capabilities pose a serious threat to the enterprises or offices with sensitive information, such as national security agencies, military and national defense forces, and various government agencies. In many such locations, there are posted plaques that forbid the mobile device usage, however, the mobile device users' compliances are not guaranteed. In addition to such restrictions, security alert level as well the security requirements of these facilities may be changed at any time. For example, when an emergency happens, we need to allow mobile device users to have communication capability so that emergency information can be communicated to the mobile device users. Therefore, it is desirable to have a location based mobile device security enforcement system to: (a) install a mobile device security application onto mobile devices, (b) register each mobile device user and create a mobile device user profile, (c) create a security policy, (d) monitor all mobile devices in a secure area, and (e) make security control changes according to the security policy when certain conditions are met. These security control changes include enabling or disabling the camera function, the microphone function, and network connection function.

Therefore, heretofore unaddressed needs still exist in the art to address the aforementioned deficiencies and inadequacies.

SUMMARY

In one aspect, the present disclosure relates to a location based mobile device security enforcement system. In certain embodiments, the location based mobile device security enforcement system includes: (a) a mobile device management (MDM) server, (b) a security control module, (c) an entry point security system, and (d) a mobile device security application. The mobile device management (MDM) server is configured to maintain a record of each mobile device as well as its user, including a mobile device user profile and a security policy for the mobile device user. The security control module is configured to (b-1) receive mobile device user's registration and save the mobile device user's registration in the MDM server, (b-2) create a mobile device user profile and a security policy for each mobile device user, (b-3) store the mobile device user profile and the security policy in the MDM server, (b-4) transmit the mobile device user profile and the security policy to each mobile device, (b-5) maintain constant contact with each mobile device, and (b-6) update the user security policy to each mobile device when needed. The entry point security system is configured to (c-1) install a mobile device security application on every new mobile device, (c-2) register the mobile device user when the mobile device user enters a secure area, (c-3) deregister the mobile device user when the mobile device user leaves the secure area, and (c-4) optionally uninstall the mobile device security application. The mobile device security application is to be installed in a mobile device, and when the mobile device security application is executed on the mobile device, it is configured to: (d-1) register the mobile device and its user to create a mobile device user profile for the mobile device user, (d-2) when the mobile device and its user enter a secure area, authenticate the mobile device user, (d-3) maintain constant contact with the security control module, and (d-4) make security adjustments to the mobile device when certain conditions are met.

In certain embodiments, the security policy transmitted to the mobile device includes: (a) the user's name, (b) the user's mobile phone number, (c) the user's mobile device type, (d) the user designation, (e) the area security level, and (f) the premises area map. The mobile device user profile contains information such as: (a) the name of the mobile device user, (b) the title of the mobile device user, (c) the company of the mobile device user, (d) the user designation, (e) the mobile device type, (f) the MAC address of the mobile device, and (g) the mobile phone number of the mobile device. The mobile devices include mobile phones, smart mobile phones, tablet computing devices, and laptop computers. The mobile devices are network connected through a wireless communication network, a Wi-Fi network, a Bluetooth network, and a Zigbee personal area network, and each mobile device has at least one recording device.

In certain embodiments, the mobile device security application includes: (a) a user interface module configured to allow the mobile device user to log into the location based mobile device security enforcement system, and register the mobile device and the mobile device user, (b) a device monitoring module configured to maintain communication between the MDM server and the mobile device and constantly monitors the current location of the mobile device, (c) a mobile device security software configured to make security control changes to certain functions of the mobile device when the device monitoring module determines that certain conditions are met and certain security adjustments are needed. The mobile device security software is further configured to (a) receive emergency messages from the security control module of the location based mobile device security enforcement system when an emergency occurs, (b) display the emergency messages on the user interface module of the mobile device security application, and (c) display an evacuation route according to the current location of the mobile device and an evacuation destination received from the emergency messages.

In certain embodiments, the certain conditions include: (a) if the contact between the mobile device and the security control module is lost, (b) if the mobile device security application becomes non-operational, (c) if the current time is beyond the mobile device user authorized access time period, and (d) if the current location of the mobile device is outside of the mobile device user authorized access area or crosses the borders between one area security level to another area security level. The location of the mobile device is determined by: (a) a GPS location system, (b) a Wi-Fi location system, or (c) an access point location system.

In certain embodiments, the security control module is further configured to (a) manually edit the mobile device user profile and the security policy, (b) store the mobile device user profile and the security policy in the MDM server, (c) update the mobile device user profile and the security policy at the mobile device, and (d) broadcast emergency messages to all mobile devices registered in the location based mobile device security enforcement system when an emergency occurs. The security adjustments include: (a) enabling or disabling the image and video recording function of the mobile device, (b) enabling or disabling the voice recording function of the mobile device, and (c) enabling or disabling the telephone function of the mobile device. The recording devices of the mobile device are enabled and disabled through the operating system of the mobile device, a camera driver, and a microphone driver on the mobile device.

In certain embodiments, the mobile device security application is installed (a) by downloading the mobile device security application to the mobile device at the entry point security system, (b) by downloading the mobile device security application to the mobile device through a non-volatile memory device, and (c) by downloading the mobile device security application to the mobile device from a website through a predetermined URL, and (d) by downloading the mobile device security application through an application store. Each of the mobile device users is registered (a) at the entry point security system, or (b) at the mobile device after the mobile device user downloaded and installed the mobile device security application. The mobile device user information is transmitted to the security control module where the mobile device user profile and security policy are created, and the mobile device user profile and security policy are transmitted to the MDM server and the mobile device directly through a communication channel.

In another aspect, the present disclosure relates to a method for enforcing a security policy on mobile devices to ensure security control of the mobile devices in a secure area. In certain embodiments, the method includes: (a) installing a mobile device security application on the mobile devices when the mobile device users enter the secure area, (b) registering each of the mobile device users, (c) creating a mobile device user profile for each mobile device user after the mobile device user logs into the mobile device security application, and storing the mobile device user profile in an mobile device management (MDM) server of a location based mobile device security enforcement system, (d) creating a security policy for each of the mobile device users at a security control module of the location based mobile device security enforcement system, storing the security policy in the MDM server and transmitting the security policy to each mobile device, (e) updating mobile device user profiles and the security policies by the security control module of the location based mobile device security enforcement system dynamically as necessary, (f) monitoring the location of each mobile device by the mobile device security application installed on the mobile devices, and (g) making security adjustment according to the security policy on the mobile device when certain conditions are met.

In certain embodiments, the security policy transmitted to the mobile device includes: (a) the user's name, (b) the user's mobile phone number, (c) the user's mobile device type, (d) the user designation, (e) the area security level, and (f) the premises area map. The mobile device user profile contains information such as: (a) the name of the mobile device user, (b) the title of the mobile device user, (c) the company of the mobile device user, (d) the user designation, (e) the mobile device type, (f) the MAC address of the mobile device, and (g) the mobile phone number of the mobile device.

In certain embodiments, the mobile device security application includes: (a) a user interface module configured to allow the mobile device user to log into the location based mobile device security enforcement system, and register the mobile device and the mobile device user, (b) a device monitoring module configured to maintain communication between the MDM server and the mobile device and constantly monitors the current location of the mobile device, and (c) a mobile device security software configured to make security control changes to certain functions of the mobile device when the device monitoring module determines that certain conditions are met and certain security adjustments are needed. The certain conditions include: (a) if the contact between the mobile device and the MDM server is lost, (b) if the mobile device security application becomes non-operational, (c) if the current time is beyond the mobile device user authorized access time period, and (d) if the current location of the mobile device is outside of the mobile device user authorized access area or crosses the borders between one area security level to another area security level.

In yet another aspect, the present disclosure relates to a non-transitory computer storage medium. The non-transitory computer storage medium stores computer-executable instructions. When the computer-executable instructions are executed by a processor of a mobile device, the computer-executable instructions cause the processor to: (a) install a mobile device security application on a mobile device when the mobile device user enter a secure area, (b) register the mobile device user, (c) create a mobile device user profile for the mobile device user after the mobile device user logs into the mobile device security application, and store the mobile device user profile in an mobile device management (MDM) server of a location based mobile device security enforcement system, (d) create a security policy for the mobile device user at a security control module of the location based mobile device security enforcement system, store the security policy in the MDM server and transmit the security policy to the mobile device, (e) update mobile device user profile and the security policy by the security control module of the location based mobile device security enforcement system dynamically as necessary, (f) monitor the location of the mobile device by the mobile device security application installed on the mobile device, and (g) make security adjustment according to the security policy on the mobile device when certain conditions are met. The security adjustments are made based on the security policy and the mobile device user profile updated dynamically in real time, the location of the mobile device, the user designation, the area security level, and the current time.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 2 is a table showing whether certain functions are allowed for various mobile device users under different user security designation and at different security alert level according to one embodiment of the present disclosure.

DETAILED DESCRIPTION

Figure 1:
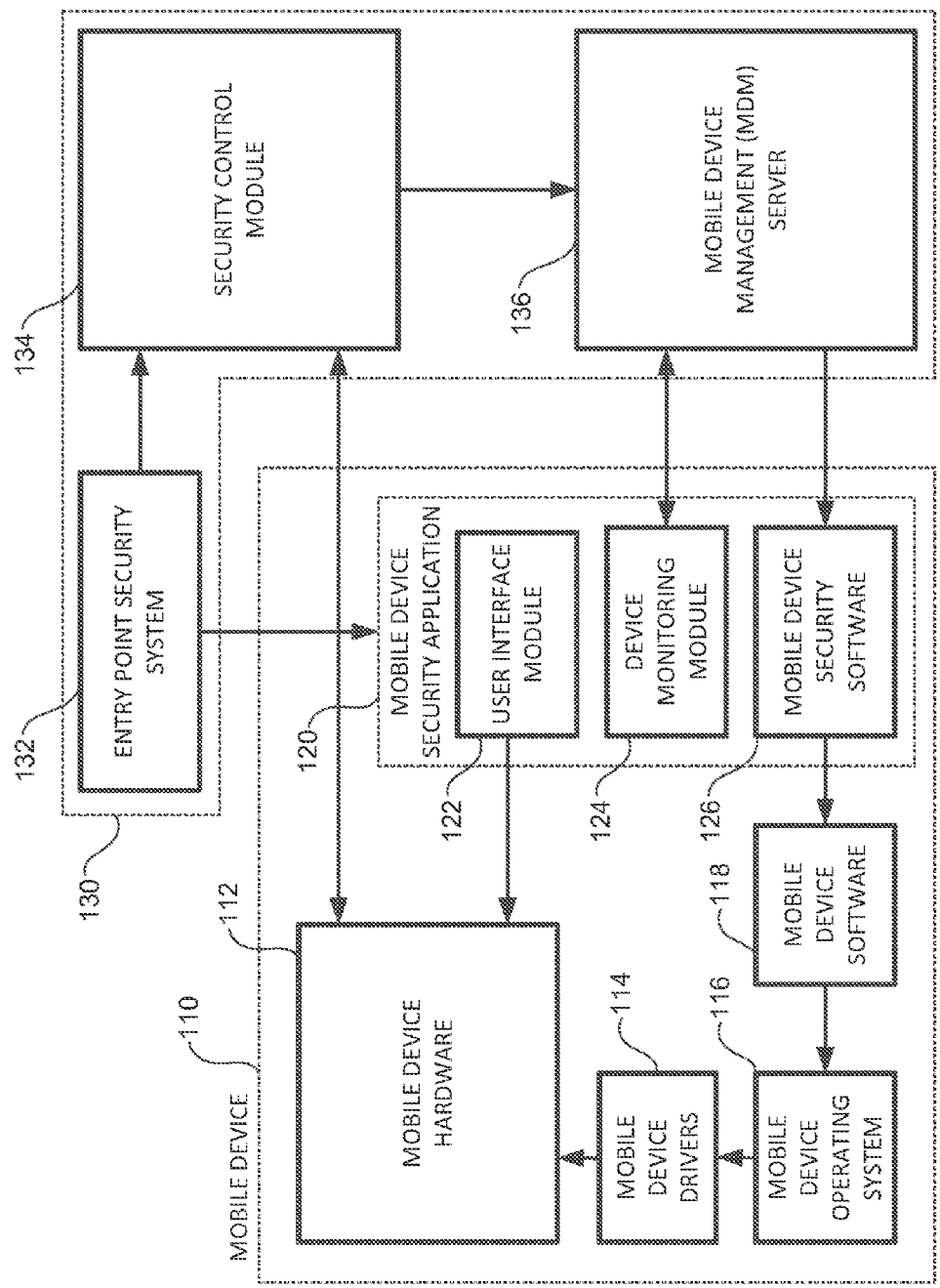
FIG. 1 shows a block diagram of a location based mobile device security enforcement system according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

FIG. 1 shows a block diagram of a location based mobile device security enforcement system 130 according to one embodiment of the present disclosure. The location based mobile device security enforcement system 130 includes: an entry point security system 132, a security control module 134, a mobile device management (MDM) server 136, and a mobile device security application 120 installed on a mobile device 110.

In certain embodiments, the mobile device 110 can be a smart phone such as an iPhone from Apple Inc., a Blackberry from RIM, a Galaxy from Samsung. The smart phone is essentially mobile phone built on a mobile operating system having more advanced computing capability and connectivity such as personal digital assistant (PDA), portable media players, digital cameras, video cameras, and GPS navigation units to form one multi-use device. Many modern smart phones also include high-resolution touchscreens and web browsers that display standard web pages as well as mobile-optimized sites. High-speed data access is provided by Wi-Fi and mobile broadband. In recent years, the rapid development of mobile APP markets and of mobile commerce have been drivers of smart phone adoption.

The mobile operating systems (OS) used by modern smart phones include GOOGLE's ANDROID, APPLE's iOS, NOKIA's SYMBIAN, RIM's BlackBerry OS, SAM- SUNG's Bada, MICROSOFT's Windows Phone, HEWLETT-PACKARD's webOS, and embedded Linux distributions such as Maemo and MeeGo. Such operating systems can be installed on many different phone models, and typically each device can receive multiple OS software updates over its lifetime.

In certain embodiments, the mobile device 110 has: (a) mobile device hardware 112, (b) mobile devices drivers 114, (c) mobile device operating system 116, and (d) mobile device software. The mobile device hardware 112 includes: (a) a user interface to receive user's input, and display information to the user, (b) ability to receive and install a mobile device security application program (APP) on the mobile device, (c) ability to track local time, (d) a mobile device positioning system either through a space-based satellite navigation system (Global Positioning System, GPS) or through Wi-Fi triangulation fixed units in the building that is capable of publishing the position to the mobile devices by conventional means such as Bluetooth or any other indoor location finding techniques. The mobile device drivers includes at least: (a) a telephone device driver, (b) a microphone device driver, and (c) a camera device driver. The telephone device driver enables the user to communicate through its wireless communication networks. The camera devices driver allows the user to take still image pictures or carry out video recording. The microphone device driver allows the user to perform audio recording or audio communication. The telephone device driver, the camera device driver, and the microphone device driver are all operated and controlled by the mobile device operating system 116. The mobile device software 118 receives instructions or commands from the mobile device security application to enable or disable the functionalities of the telephone device, the camera device, and the microphone device, and then forwards these instructions or commands to the mobile device operating system 116. The mobile device operating system 116 forwards the instructions or commands to the mobile device driver and turn on or off these devices drivers.

In certain embodiments, the user interface of the mobile device 110 allows the user to access the internet, install and operate applications. The ability to track local time and location of the mobile device 110 allows a mobile device security application to function and adjust the security policy in real time based on the current time, and location of the mobile device. The key to the mobile device security enforcement system is the ability to enable and disable the camera function, microphone function, and telephone function according to a real time security policy including area security level, user designation, location of the mobile device, the current time, and the accessible area of the mobile device user.

Once the mobile device security application is installed on the mobile device 110, the user can use the user interface of the mobile device security application to create a new user account, enter user information, receive user designation, and a security policy from a mobile device management (MDM) server. Once the mobile device security application is installed on the mobile device, and the user activates his/her account through a user interface on the mobile device, the mobile device maintains a constant communication with the MDM server, keeps track of the time and location of the mobile device, updates security policy in real time, makes security adjustments on the mobile device according to the security policy. For example, if the user disables the mobile device security application function, or if the mobile device (hence the user of the mobile device) moves out of his/her authorized area, or when the security policy requires, some of the mobile device functions such as telephone communication, microphone, or camera, will be disabled depending on the user's designation, the current security alert level, current time, and current location of the mobile device.

In certain embodiments, the mobile device security application 120 includes at least: (a) a user interface module 122, (b) a device monitoring module 124, and (c) mobile device security software 126.

In certain embodiments, the user interface module 122 is used by the user to interact with the mobile device security enforcement system 130. In one embodiment, the user interface module 122 interacts with a security control module 134 of the mobile device security enforcement system 130 through the mobile device hardware 112 to register the user, to establish a new account, to assign a user designation, and based on the user designation, to establish a security policy towards the user, and to save the security policy on the mobile device.

In certain embodiments, the device monitoring module 124 is used by the mobile device hardware 112 to maintain a constant communication with the MDM server, reporting the current location of the mobile device to the MDM server in real time. When the device monitoring detects any abnormality of the operation of the mobile device security application, such as the application is disabled, the mobile device has moved off the authorized area, the device monitoring module 124 will inform the mobile device security software 126, and the mobile device security software 126 will instruct the mobile device operating system 116 to disable the telephone, the camera, and the microphone devices according to the security policy.

The device monitoring module 124 keeps track of the location of the mobile device 110. It uses (a) Global Positioning System (GPS), (b) Wi-Fi triangulation, (c) communication access point triangulation, and (d) a combination of (a), (b), and (c) to determine the coordinates of the current location of the mobile device 110. Once the location of the mobile device is determined, the device monitoring module 124 reports the location of the mobile device to the MDM server 136.

In certain embodiments, the mobile device security software 126 interacts with the MDM server 136, updates the security policy in real time, reporting the location of the mobile device to the MDM server 136. When device monitoring module 124 detects any abnormality of the operation of the mobile device security application, or when the security policy requires certain device drivers to be disabled or enabled, the device monitoring module 124 will inform the mobile device security software 126, and the mobile device security software 126 will instruct the mobile device operating system 116 to enable or disable one or more of the telephone, the camera, and the microphone devices according to the security policy.

The mobile device security software 126 includes a device control module. Practically, the mobile device security software 126 is a self-policing device. The mobile device security software 126 keeps track of the location and time of the mobile device, and make security changes according to the security policy received from a security control module 134 of a location based mobile device security enforcement system 130. The device monitoring module 124 keeps constant contact with the security control module 134 of the location based mobile device security enforcement system 130. If the contact is lost, if the mobile device moves to an area outside of its authorized access area, if the user's access time to the authorized area has expired, the mobile device security software 126 will send out commands to make security changes to the devices installed on the mobile device such as mobile phone, microphone, and camera. If there is a need for the security control module 134 of the location based mobile device security enforcement system 130 to send out any commands for making security changes to the mobile device, these commands will be received by the mobile device security software 126. The mobile device security software 126 will then send a command to the mobile device software 118 to control the devices installed on the mobile device 110, the mobile device software 118 will then send the instructions to the mobile device operating system 116 to control the mobile device drivers 114 to enable or disable certain functions of the devices according to the security policy of the mobile device 110. The mobile device operating system 116 is connected to the mobile device drivers 114 including a camera driver, a microphone driver, and telephone driver such that the mobile device operating system 116 is able to enable and disable the functions of the camera driver, the microphone driver, and the telephone driver.

The reasons for the mobile device security software 126 to have ultimate control of the mobile device drivers are: (a) the security policy is executed locally according to the latest security policy, and (b) if for some reason the contact between the mobile device and the security control module 134, the security policy can still be executed. If the security control module 134 of the location based mobile device security enforcement system 130 has the controls, then the control may be lost if the communication/contact between the mobile device and the security control module 134 is lost. If the mobile device is moved outside of the authorized area, or it has passed authorized time period, the mobile device security software 126 can turned off the telephone, microphone, and camera functions immediately to minimize security risks.

For example, if the mobile device security application installed on the mobile device is non-operational. Such non-operational can be caused by disabling, or uninstalling the mobile device security application by the mobile device user. The mobile device security software 126 is configured such that before the application can be disabled, turned off, or uninstalled, for security purposes, the mobile device security software 126 will disable the telephone function, the microphone function, and the camera function off. The recovery of the these functions has to go through mobile device security software 126 when the mobile device security application becomes operational again, and these functions can be restored by the current security policy including user designation, area security level, current location of the mobile device, and current time.

On the other hand, if the mobile device has moved beyond mobile device user authorized accessible areas, or if the mobile device user's authorized time period to access the secure area is expired, the mobile device security application will compare its current location and current time with the mobile device user authorized accessible areas, and the mobile device user's authorized time period of the security policy. If the mobile device is outside of the mobile device user authorized accessible areas, or if the mobile device user's authorized time period exceeds the mobile device user's authorized time period, then the mobile device security software 126 will make security changes according to the security policy. For example, if the mobile device user having Low user designation moved from the Red designation area to the Orange designation area, then the mobile device security software 126 will enable the mobile device user's phone function, however, the microphone and camera functions remain disabled. If the mobile device user having Low user designation moved from the Red designation area to the Green designation area, then the mobile device security software 126 will enable the mobile device user's phone function, microphone function and camera function. Likewise, if the mobile device user having Low user designation moved from the Green designation area to the Red designation area, then the mobile device security software 126 will disable the mobile device user's phone function, microphone function and camera function.

In certain embodiments, the mobile device security application 120 can be installed on the mobile device in a few different ways:
(a) The mobile device can be connected to a computer system through its cable connection such as USB cable, iPhone cable, and directly download the mobile device security application 120 on to the mobile devices;
(b) The mobile device can receive a URL and the mobile device user uses the URL to retrieve the mobile device security application 120 and install on the mobile device;
(c) The mobile device user can download the mobile device security application 120 to the mobile device through a non-volatile memory device; and
(d) The mobile device user can obtain the mobile device security application 120 from APP stores such as Apple App, Google Play Store, Blackberry World, Window Phone Store Firefox Marketplace, and Amazon Appstore etc.

In certain embodiments, the location based mobile device security enforcement system 130 includes at least: (a) an entry point security system 132, (b) a security control module 134, and (c) a mobile device management (MDM) server 136.

In certain embodiments, the entry point security system 132 is placed at one or more entry points of an enterprise, and is used by the security personnel of the enterprise to ensure that every mobile device including mobile phone, laptop computers, and tablet computers are in compliance of the security policy established by the enterprise.

The basic functions of the entry point security system 132 include:
(a) Install the mobile device security application on each and every one of the mobile device brought into the enterprise premise;
(b) Register the owner of each mobile devices and create a user profile at the security control module 134;
(c) Assign a user designation;
(d) Assign a default area and a designated area for each user to visit;
(e) Assign an accessible time period for each user;
(f) Load initial security policy onto each mobile device; and
(g) Optionally or at user's request, uninstall the mobile device security application when the user leaves the premises.

In certain embodiments, the mobile device security application can be an Android application program, an iOS application program, or application program of other mobile device operating system. In order to ensure the security policy is strictly followed, each and every one of the mobile device should have the mobile device security application installed. After the installation of the mobile device security application, the security personnel will have to register each user in the security control module 134 such that each user entered with their mobile device will be monitored by the location based mobile device security enforcement system 130.

The users of the mobile devices can be (a) a member of the management team of the enterprise who will be given high priority and privilege, (b) a regular employee of the enterprise who will be given medium priority and less privilege, and (c) a visitor to the enterprise who will be given lowest priority and privilege. Therefore, these users are given three different user designations: (a) low for visitors, (b) medium for regular employees, and (c) high for the members of management team. In addition to the user designations, there are also three different area security levels: (a) Green for general reception area, and conference rooms; (b) Yellow for offices, and (c) Red for area with sensitive activities and sensitive materials.

FIG. 2 is a device control profile table showing whether certain functions are allowed for various mobile device users under different user designation and at different area security levels according to one embodiment of the present disclosure.

For a visitor having a low user designation: (a) in the Green area security level such as reception area, conference rooms, parking area, and other low risk areas, he/she is allow to use the mobile phone service, camera function, microphone function, and is given network/Wi-Fi access; (b) in the Orange area security level such as inside office building, warehouse, normal business areas and other medium risk areas, he/she is allow to use the mobile phone service and is given network/Wi-Fi access. The camera function and microphone function are turned off so he/she is not allowed to make audio recordings and take any pictures or video recordings; and (c) in the Red area security level such as inside management offices, research labs, library and archives where there are sensitive activities or sensitive information, he/she is allow to use network/Wi-Fi access for tracking his or her location. The camera function, microphone function and mobile phone function are turned off so he/she is not allowed to make phone calls, make audio recordings and take any pictures or video recordings.

For a regular employee having a medium user designation and regular security clearance: (a) in the Green area security level, or in the Orange area security level, he/she is allow to use the mobile phone service, camera function, microphone function, and is given network/Wi-Fi access; and (b) in the Red area security level such as inside management offices, research labs, library and archives where there are sensitive activities or sensitive information, he/she is allow to use the mobile phone service and is given network/Wi-Fi access. The camera function and microphone function are turned off so he/she is not allowed to make audio recordings and take any pictures or video recordings.

For a member of management having a high user designation and high security clearance, he/she is allowed to use the mobile phone service, camera function, microphone function, and is given network/Wi-Fi access, in all area including the Green, the Yellow and the Red area security levels.

In certain embodiments, these restrictions can be manually overridden through the security control modules on an individual basis or for all registered users.

At the registration, a new mobile device user profile is created for each new user. The mobile device user profile includes one or more of following information:
(a) device control profile information such as the profile table shown in FIG. 2;
(b) the name of the mobile device user;
(c) the title of the mobile device user;
(d) the company of the mobile device user;
(e) the user designation;
(f) the mobile device type;
(g) the MAC address of the mobile device; and
(h) the mobile phone number of the mobile device.

In certain embodiments, the mobile device user information can be entered into the location based mobile device security enforcement system 130 in several different ways:
(a) A security personnel enters mobile device user information at the entry point security system 132. The user information is transmitted to the security control module 134. A mobile device user profile is created at the entry point security system 132 and then transmitted to the MDM server and the mobile device; and
(b) After the mobile device security application 120 is installed on the mobile device, the mobile device can open the application and register his/her information using the application. The user information is transmitted to the entry point security system 132 through mobile communication network or Wi-Fi networks. A mobile device user profile is created at the entry point security system 132 and then transmitted to the MDM server and the mobile device.

After the mobile device user registration, a mobile device user profile and a security policy for the user created for each mobile device user. The mobile device user profile and the security policy are stored in the MDM server 136 and transmitted to the mobile device. The security policy includes one or more following items of information:
(a) the user's name;
(b) the user's mobile phone number;
(c) the user's mobile device type;
(d) the user designation;
(e) the area security level; and
(f) the premises area map.

The user's name and user's mobile phone number are used for user contact. The user's security designation and the premises area map are used to enforcement of the security policy. The security policy is transmitted to the mobile device such that even if the mobile device lost communication between the mobile device and the security control module 134, the mobile device security application will be able to maintain the control of the microphone device, telephone communication and camera functions. The mobile device security application is configured to disable all mobile phone function, microphone function, and camera function if the user attempts to disable the mobile device security application.

In certain embodiments, the premises area map includes many different unit areas. All unit areas make up the entire enterprise premises. Each of the unit area has an area security level. The premises area map defines the security level of entire premises. For example, the lobby, reception area, the restrooms are marked as Green area security level, and the offices are marked as Orange area security level and so on. The premises area map is transmitted to each individual mobile device and the premises area map in the mobile device is synchronized with the premises area map in the MDM server. These area security levels can be changed dynamically in real time by the security administrator. When the security administrator needs to change the area security level of certain areas in the premises, the area security level of these certain areas in the premises are changed at the MDM server first by the security administrator, then broadcasted to every mobile device operating in the premises. Such changes are synchronized with every mobile device.

As it is described earlier, the access permissions of the mobile device user can be changed at any time. If the security administrator wishes to give an individual mobile device user special permission to access certain areas, the security administrator can change his/her user designation from one level to another. For example, a low user designation visitor can be changed to a medium or high user designation to have all the privileges of a mobile device user of medium or high user designation. On the other hand, a mobile device user with medium or high user designation can also be assigned low user designation if certain security situation requires the security administrator to do. Unlike the area security level change in the premises area map is global, such user designation change is individual, and such change remains until the security administrator changes the user designation of the mobile device user at a later time.

In certain embodiments, the security control module 134 is configured to
(a) receive user's registration and save the user's registration in the MDM server 136;
(b) create a user profile for each user and save the user's user profile in the MDM server 136;
(c) create a user security policy for each user, save the security policy in the MDM server 136, and transmit the security policy to each mobile device; and
(d) when in need, manually edit the user profile, and the security policy, save the user profile, and the security policy in the MDM server 136, and update the user profile, and the security policy through the mobile device.

In certain embodiments, the security control module 134 accepts the user registration from the entry point security system, or through the user interface of the mobile device. User information is then stored in the MDM server 136. Based on the information from the user registration, a user's profile and a security policy are created at the security control module 134, and then stored in the MDM server 136. The security policy is also transmitted to the mobile device so that the mobile device security software 126 on the mobile device can make certain security changes when certain conditions are met.

In certain embodiments, the security control module 134 can be used to broadcast emergency messages to all mobile devices registered in the location based mobile device security enforcement system 130 when an emergency occurs. For example, if there is an emergency for tornado warning, or fire emergency, the security control module 134 can send out emergency messages to all mobile devices registered in the system and warning the mobile device users.

In addition to sending out emergency messages, the security control module 134 can also send evacuation messages to the mobile devices in the premises if an evacuation is required. The evacuation messages may include a destination area where evacuees can gather. The mobile device security application can then prepare a safe and quick evacuation route based on the current location of the mobile device user, and the evacuation destination. This evacuation route can be displayed on the screen of the mobile device so that the mobile device user can be quickly and safely evacuate to the evacuation destination.

The location based mobile device security enforcement system 130 can also be used to manage the power consumption of the mobile devices. For example, when a visitor with low user designation enters an area with Red area security level, the microphone and camera functions are disabled according to the security policy stored in the mobile device. At this time, microphone device, camera device, flash light device and all other irrelevant devices and peripherals on the mobile device can be turned off to reduce the power consumption. When the mobile device is in idle state, the clock speed of the mobile device processor can be reduced (under clock) to further reduce the power consumption of the mobile devices.

Based on the location of the visitor/employee and current security level assigned to the location, the secured phone will perform the power management. The system will turn-off the irrelevant peripherals and reduces the clock speed of the processor (under clock) when the system is in idle.

In certain embodiments, the mobile device management (MDM) server 136 is configured to maintain a record of each mobile device as well as its user, including a mobile device user profile and a security policy for the mobile device user.

The security policy can be changed at any time by the location based mobile device security enforcement system 130. These changes can be made individually to each mobile device, or globally to all mobile devices in the location based mobile device security enforcement system 130. If there are any changes to the security policy, the changes are updated and transmitted to the relevant mobile device immediately.

Figure 3:
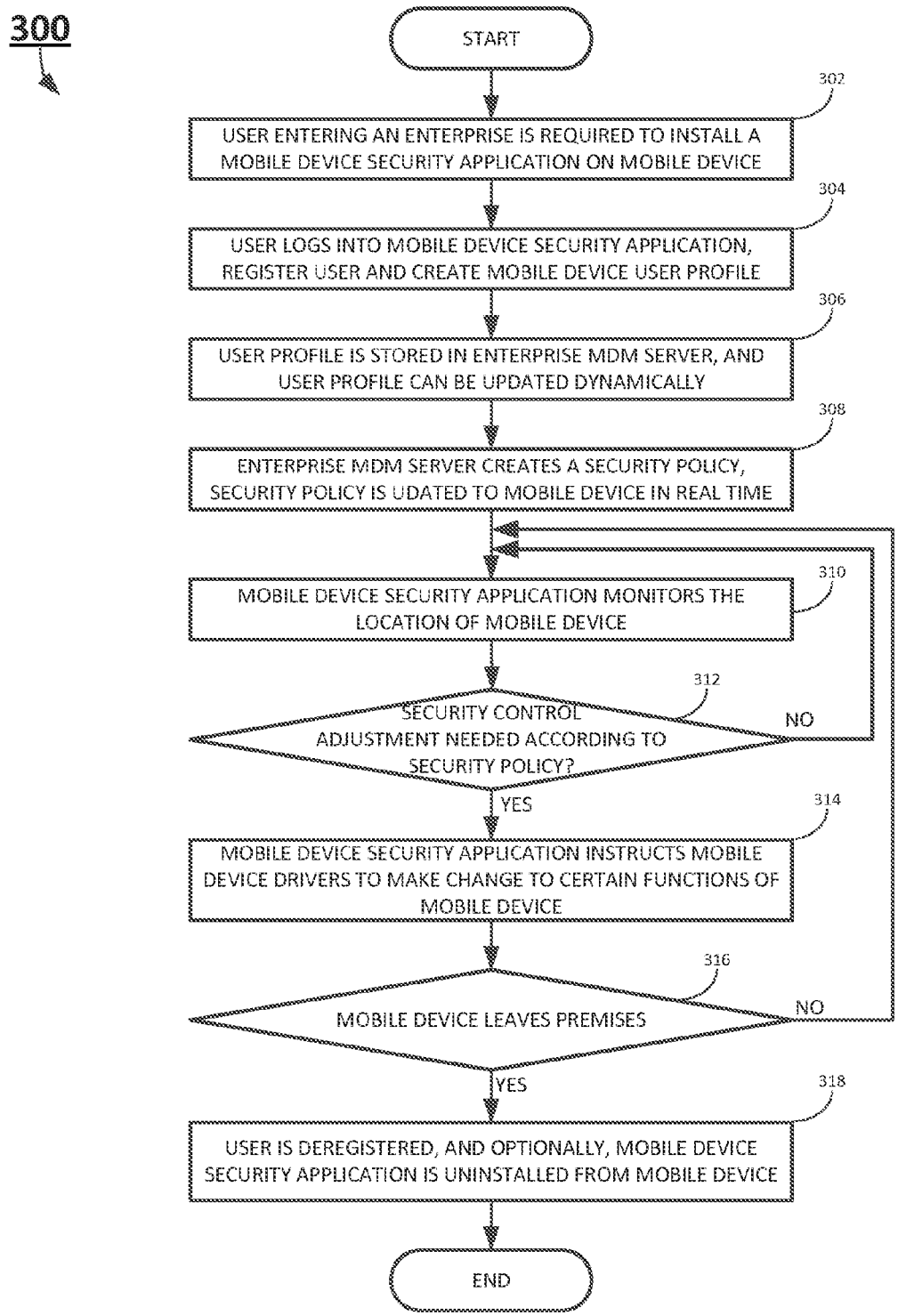
FIG. 3 shows a flow chart of operations of the location based mobile device security enforcement system according to one embodiment of the present disclosure.

FIG. 3 shows a flow chart 300 of exemplary operations of a location based mobile device security enforcement system 130 according to certain embodiments of the present disclosure.

At operation 302: at the start, when a mobile device user enters a secure area, the user is required to install a mobile device security application on his/her mobile device to ensure all security measures are enforced at the time while the mobile device user is in the secure area according to the user's area security level and user designation. The area security level includes: Green for entry points, conference rooms, lobby, hallway, or restrooms, Orange for offices, workshops, and Red for sensitive areas and where sensitive materials achieves, library, or document storages. Even the employees of the enterprise have to strictly follow these protocols. However, the employees are given higher user designation than a non-employee visitor. The user designations include: low for non-employee visitor, medium for regular employees, and high for management of the enterprise. Occasionally, at the discretion of the security personnel, certain visitors are granted higher user designation according to certain security policy on an individual basis.

The mobile device security application 120 is installed either by connecting to the mobile device to a computer of the entry point security system 132, or by sending a URL link to the mobile device, and allowing the user to install the mobile device security application 120 onto the mobile device.

At operation 304: once the mobile device security application 120 is installed on the mobile device, the mobile device user is required to provide user information and register a new user. The security personnel can enter the mobile device user information at the computer of the entry point security system 132. The mobile device user information can also be entered by the mobile device user when he/she opens the mobile device security application 120 for the first time. The mobile device user information is entered by the mobile device user and the user information is transmitted to the entry point security system 132.

At operation 306: A mobile device user profile is created for each mobile device user at the entry point security system 132, then stored at the MDM server 136, and transmitted back to the mobile device with username and password so that the mobile device can login into the location based mobile device security enforcement system 130. The mobile device user profile can be changed at any time at the security control module 134 of the location based mobile device security enforcement system 130. The mobile device user profile is updated in real time at the MDM server 136. The updated mobile device user profile is immediately synchronized to the mobile device.

At operation 308: In addition to the mobile device user profile, a security policy is created for each registered mobile device user, and transmitted to the mobile device such that, the mobile device security application 120 can enforce the security policy while the mobile device user is within the enterprise premises. The security policy for the mobile device user can be changed at any time at the security control module 134 of the location based mobile device security enforcement system 130. The security policy is updated in real time at the MDM server 136. The updated mobile device user profile and the security policy are immediately synchronized to the mobile device.

At operation 310: the device monitoring module 124 of the mobile device security application 120 on the mobile device monitors the location of the mobile device. The location of the mobile device is determined by GPS technology, Access Point and Wi-Fi triangulation. The device monitoring module 124 also keeps constant contact with the security control module 134 and report the location of the mobile device to the security control module 134.

At operation 312: if the device monitoring module 124 determines if any security adjustment is needed, the mobile device security software 126 of the mobile device security application 120 will make certain security adjustment according to the current security policy stored on the mobile device. Therefore, if security adjustment is needed, the operation continues to the Operation 314. Otherwise, if there is no need to make any security adjustment, the operation goes back to the operation 310. If one or more of the conditions listed below are met, the mobile device security software 126 of the mobile device security application 120 will make certain security adjustments to the mobile device according to the security policy:

(a) if the contact between the mobile device and the security control module 134 is lost, then the security control module 134 will no longer be able to update the security policy;

(b) if the mobile device security application 120 becomes non-operational. Before the mobile device security application 120 is disabled, uninstalled, and turned off;

(c) if the current time is beyond the mobile device user authorized access time period; and (d) if the current location of the mobile device is outside of the mobile device user authorized access area or crosses the borders between one area security level to another area security level.

At operation 314: if one or more of the conditions (a) and (b) are met, the mobile device security software 126 of the mobile device security application 120 will first disable the telephone function, microphone function and camera function of the mobile device to minimize the security risk. When the contact between the mobile device and the security control module 134 is recovered, and/or the mobile device security application 120 becomes operational again, the mobile device security application 120 will be registered and login into the location based mobile device security enforcement system 130. The mobile device user profile and security policy for the mobile device will be updated and synchronized again. The individual device functions such as telephone, microphone, and camera will be reset by the mobile device security software 126 according to the current security policy.

If condition (c) is met, the mobile device security software 126 of the mobile device security application 120 will first disable the telephone function, microphone function and camera function of the mobile device to minimize the security risk. The disabled functionalities remain until the security policy for the mobile device is updated and transmitted to the mobile device. When a new security policy is updated and sent to the mobile device, the mobile device security software 126 of the mobile device security application 120 will reset the these functionalities according to the updated security policy.

If conditions (d) is met, the mobile device security software 126 of the mobile device security application 120 will first decide what security adjustment is needed.

(a) If the low user designation mobile device moved from the Red area security level or Orange area security level to a Green area security level, his/her telephone function, microphone function and camera function will be enabled.

(b) If the low user designation mobile device moved from the Green area security level an Orange area security level, his/her microphone function and camera function will be disabled. However, the telephone function remains, (c) If the low user designation mobile device moved from the Green area security level a Red area security level, his/her telephone function, microphone function and camera function will be disabled.

(d) If the low user designation mobile device moved from the Red area security level to Orange area security level, his/her telephone function will be enabled. However, his/her microphone function and camera function remain disabled.

(e) If the medium user designation mobile device moved from the Orange area security level to the Red area security level, his/her microphone function and camera function will be disabled. However, the telephone function remains.

(f) If the medium user designation mobile device moved from the Red area security level to the Orange area security level or the Green area security level, his/her telephone function, microphone function and camera function will be enabled.

(g) No security adjustment is necessary for high user designation mobile device users.

The security policy adjustments remain until the device monitoring module 124 of the mobile device security application 120 determines that another security adjustment is required.

At operation 316: at this inquiry operation, if the mobile device user decided to leave the secured area, it continues to operation 318. Otherwise, it goes back to operation 310.

At operation 318: at the exit, the mobile device is deregistered through the entry point security system 132. During the deregistration process, all mobile device functionalities including the telephone function, the microphone function and the camera function are all enabled. At mobile user's discretion, the mobile device user may optionally uninstall the mobile device security application 120. For those of mobile device users employed and work in the enterprise, they will keep the mobile device security application 120 on their mobile devices for future return back to the secure area.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A location based mobile device security enforcement system, comprising:
    a mobile device; and
    a management system comprising:
        one or more non-transitory storage-devices storing computer executable instructions; and
        a processor configured to execute the computer executable instructions to:
        monitor the mobile device located in a secure area by receiving a report from the mobile device security application on the mobile device, wherein the secure area comprises at least one authorized accessible area for the mobile device;
        interact with the mobile device located in the secure area to register a mobile device user of the mobile device;
        in response to registering the mobile device user, create a mobile device user profile and a security policy for the mobile device based on the registration, and store the mobile device user profile and the security policy in a mobile device management (MDM) server, wherein the security policy comprises a user designation level of the mobile device selected from a plurality of user designation levels, information of the at least one authorized accessible area for the mobile device, and information of authorized period of time for the mobile device; and
        transmit the security policy to the mobile device;
    a security control module separate from the mobile device and configured to maintain a constant contact with the mobile device;
    one or more first computers at the secure area, separate from the mobile device, and each configured to,
        allow a user to install the mobile device security application on the mobile device through a connection established between the first computer and the mobile device;
        register, with the management system, the mobile device user and create the mobile device user profile based on the registration;
        assign the user designation level to the mobile device;
        assign the at least one authorized accessible area for the mobile device; and
        assign the authorized period of time for the mobile device;
    wherein the mobile device security application installed on the mobile device, when executed by a processor of the mobile device, is configured to:
        monitor a current location of the mobile device and a current time; and
        when the mobile device is located within the secure area,
            communicate wirelessly with the management system;
            interact with the management system to register the mobile device user;
            receive and store the security policy from the management system;
            determine whether the mobile device requires a security change to one or more functions on the mobile device by comparing the current location of the mobile device and the current time with the user designation level of the mobile device, the information of the at least one authorized accessible area for the mobile device and the information of the authorized period of time for the mobile device of the security policy; and
            in response to determining that the mobile device requires the security change to the one or more functions on the mobile device, perform the security change to each of the one or more functions on the mobile device, and disable or enable a respective driver of at least one of a camera device, a microphone device, and a telephone device of the mobile device;
        wherein the secure area comprises a plurality of sub-areas, and each of the sub-areas is designated to have one of a plurality of area designation security levels;
        wherein the at least one authorized accessible area for the mobile device comprises a plurality of the sub-areas; and
        wherein for at least one of the sub-areas, each of the plurality of user designation levels corresponds to different security changes in the area designation security level of the sub-area, and at least one user designation level corresponds to different security changes in different sub-areas having different area designation security levels;
    wherein the mobile device security application installed on the mobile device, when executed by the processor of the mobile device, is further configured to
        maintain the constant contact with the security control module;
        make security changes to the camera device, the microphone device, and the telephone device when the constant contact is lost;
        retrieve an evacuation destination from emergency messages broadcast by the security control module;
        generate an evacuation route according to the current location of the mobile device and the evacuation destination; and
        display the evacuation route on the mobile device.

2. The location based mobile device security enforcement system of claim 1, wherein the mobile device user profile comprises information corresponding to at least one of:
    a name of the mobile device user,
    a title of the mobile device user,
    a company name of the mobile device user;
    a type of the mobile device,
    a media access control (MAC) address of the mobile device, or
    a mobile phone number of the mobile device.

3. The location based mobile device security enforcement system of claim 1, wherein the computer executable instructions of the management system comprise:
    first module configured to:

monitor the mobile device located in the secure area; and interact with the mobile device located in the secure area to register the mobile device user of the mobile device; and a security control module configured to:
in response to receiving the registration data, create the mobile device user profile and the security policy for the mobile device based on the registration data, and store the mobile device user profile and the security policy in the MDM server; and transmit the security policy to the mobile device.

4. The location based mobile device security enforcement system of claim 3, wherein the first module is further configured to:
deregister the mobile device when the mobile device leaves the secure area.

5. The location based mobile device security enforcement system of claim 3, wherein the security control module is further configured to:
in response to a manual operation to edit the mobile device user profile and the security policy for the mobile device,
update the mobile device user profile and the security policy in the MDM server; and
transmit the updated security policy to the mobile device.

6. The location based mobile device security enforcement system of claim 3, wherein the security control module is further configured to:
broadcast emergency messages when an emergency occurs.

7. The location based mobile device security enforcement system of claim 6, wherein the mobile device security application is further configured to:
receive the emergency messages from the security control module of the system; and
display the emergency messages on the mobile device.

8. The location based mobile device security enforcement system of claim 3, wherein the mobile device security application comprises:
a user interface module configured to interact with the management system to register the mobile device user;
a device monitoring module configured to:
monitor the current location of the mobile device and the current time;
communicate wirelessly with the management system; and
when the mobile device is located within the secure area, determine whether the mobile device requires the security change to the one or more functions on the mobile device by comparing the current location of the mobile device and the current time with the user designation level of the mobile device, the information of the at least one authorized accessible area for the mobile device and the information of the authorized period of time for the mobile device of the security policy; and
a mobile device security software configured to, when the mobile device is located within the secure area,
receive and store the security policy from the management system; and
in response to determining, by the device monitoring module, that the mobile device requires the security change to the one or more functions on the mobile device, perform the security change to each of the one or more functions on the mobile device.

9. The location based mobile device security enforcement system of claim 1, wherein the mobile device security application is configured to determine that, based on the comparison of the current location of the mobile device with the user designation level of the mobile device and the information of the at least one authorized accessible area for the mobile device of the security policy, the mobile device requires the security change to the one or more functions on the mobile device when the current location of the mobile device is outside of the at least one authorized accessible area, or when the current location of the mobile device crosses a border between two of the sub-areas having different area designation security levels.

10. The location based mobile device security enforcement system of claim 1, wherein the information of the at least one authorized accessible area for the mobile device comprises the area designation security level of each of the sub-areas of the at least one authorized accessible area.

11. The location based mobile device security enforcement system of claim 1, wherein the mobile device security application is configured to determine that the mobile device requires the security change to the one or more functions on the mobile device when the current time is beyond the authorized period of time for the mobile device based on the comparison of the current time with the user designation level of the mobile device and the information of the authorized period of time for the mobile device of the security policy.

12. A method for performing location based mobile device security enforcement, comprising:
monitoring, by a mobile device security application installed on a mobile device, a current location of the mobile device and a current time;
communicating wirelessly, by the mobile device security application installed on the mobile device, with a location based mobile device security enforcement system when the mobile device is located within a secure area;
monitoring, by the location based mobile device security enforcement system, the mobile device located in the secure area by receiving a report from the mobile device security application installed on the mobile device, wherein the secure area comprises at least one authorized accessible area for the mobile device;
interacting, by the mobile device security application installed on the mobile device, with the location based mobile device security enforcement system to register the mobile device user when the mobile device is located within the secure area;
interacting, by the location based mobile device security enforcement system, with the mobile device located in the secure area to register a mobile device user of the mobile device;
in response to registering the mobile device user, creating, at the location based mobile device security enforcement system, a mobile device user profile and a security policy for the mobile device based on the registration, and storing the mobile device user profile and the security policy in a mobile device management (MDM) server, wherein the security policy comprises a user designation level of the mobile device selected from a plurality of user designation levels, information of the at least one authorized accessible area for the mobile device, and information of authorized period of time for the mobile device;

transmitting, by the location based mobile device security enforcement system, the security policy to the mobile device;
maintaining, at a security control module separate from the mobile device, a constant contact with the mobile device;
at a first computer separate from the mobile device and—at the secure area,
  allowing a user to install the mobile device security application on the mobile device through a connection established between the first computer and the mobile device;
  registering, with the location based mobile device security enforcement system, the mobile device user and creating the mobile device user profile based on the registration;
  assigning the user designation level to the mobile device;
  assigning the at least one authorized accessible area for the mobile device; and
  assigning the authorized period of time for the mobile device;
receiving and storing, by the mobile device security application installed on the mobile device, the security policy from the location based mobile device security enforcement system when the mobile device is located within the secure area;
determining, by the mobile device security application installed on the mobile device, whether the mobile device requires a security change to one or more functions on the mobile device by comparing the current location of the mobile device and the current time with the user designation level of the mobile device, the information of the at least one authorized accessible area for the mobile device and the information of the authorized period of time for the mobile device of the security policy;
in response to determining that the mobile device requires the security change to the one or more functions on the mobile device, performing, by the mobile device security application installed on the mobile device, the security change to each of the one or more functions on the mobile device, and disabling or enabling a respective driver of at least one of a camera device, a microphone device, and a telephone device of the mobile device, when the mobile device is located within the secure area;
maintaining, at the mobile device security application installed on the mobile device, the constant contact with the security control module;
making, at the mobile device security application installed on the mobile device, security changes to the camera device, the microphone device, and the telephone device when the constant contact is lost;
retrieving, at the mobile device security application installed on the mobile device, an evacuation destination from emergency messages broadcast by the security control module;
generating, at the mobile device security application installed on the mobile device, an evacuation route according to the current location of the mobile device and the evacuation destination;
displaying, by the mobile device security application installed on the mobile device, the evacuation route on the mobile device;

wherein the secure area comprises a plurality of sub-areas, and each of the sub-areas is designated to have one of a plurality of area designation security levels;
wherein the at least one authorized accessible area for the mobile device comprises a plurality of the sub-areas; and
wherein for at least one of the sub-areas, each of the plurality of user designation levels corresponds to different security changes in the area designation security level of the sub-area, and at least one user designation level corresponds to different security changes in different sub-areas having different area designation security levels.

13. The method of claim 12, wherein the mobile device security application is configured to determine that, based on the comparison of the current location of the mobile device with the user designation level of the mobile device and the information of the at least one authorized accessible area for the mobile device of the security policy, the mobile device requires the security change to the one or more functions on the mobile device when the current location of the mobile device is outside of the at least one authorized accessible area, or when the current location of the mobile device crosses a border between two of the sub-areas having different area designation security levels.

14. The method of claim 12, wherein the information of the at least one authorized accessible area for the mobile device comprises the area designation security level of each of the sub-areas of the at least one authorized accessible area.

15. Non-transitory computer storage media storing computer-executable instructions, wherein the computer-executable instructions, when executed by a first processor of a mobile device or a second processor of a location based mobile device security enforcement system, are configured to instruct the first processor or the second processor to:
  monitor the mobile device located in a secure area by receiving a report from a mobile device security application installed on the mobile device, wherein the secure area comprises at least one authorized accessible area for the mobile device;
  interact with the mobile device located in the secure area to register a mobile device user of the mobile device;
  in response to registering the mobile device user, create, at the location based mobile device security enforcement system, a mobile device user profile and a security policy for the mobile device based on the registration, and storing the mobile device user profile and the security policy in a mobile device management (MDM) server, wherein the security policy comprises a user designation level of the mobile device selected from a plurality of user designation levels, information of the at least one authorized accessible area for the mobile device, and information of authorized period of time for the mobile device; and
  transmit, by the location based mobile device security enforcement system, the security policy to the mobile device;
  maintain, at a security control module separate from the mobile device, a constant contact with the mobile device;
  wherein the computer-executable instructions, when executed at a first computer separate from the mobile device and at the secure area, are configured to, allow a user to install the mobile device security application on the mobile device through a connection established between the first computer and the mobile device;

register, with the location based mobile device security enforcement system, the mobile device user and create the mobile device user profile based on the registration;

assign the user designation level to the mobile device;

assign the at least one authorized accessible area for the mobile device; and assign the authorized period of time for the mobile device;

wherein the mobile device security application installed on the mobile device, when executed at a processor of the mobile device, is configured to:

monitor a current location of the mobile device and a current time;

when the mobile device is located within the secure area, communicate wirelessly with the location based mobile device security enforcement system;

interact with the location based mobile device security enforcement system to register the mobile device user;

receive and store the security policy from the location based mobile device security enforcement system;

determine whether the mobile device requires a security change to one or more functions on the mobile device by comparing the current location of the mobile device and the current time with the user designation level of the mobile device, the information of the at least one authorized accessible area for the mobile device and the information of the authorized period of time for the mobile device of the security policy; and in response to determining that the mobile device requires the security change to the one or more functions on the mobile device, perform the security change to each of the one or more functions on the mobile device, and disable or enable a respective driver of at least one of a camera device, a microphone device, and a telephone device of the mobile device;

maintain, at the mobile device security application installed on the mobile device, the constant contact with the security control module;

make, at the mobile device security application installed on the mobile device, security changes to the camera device, the microphone device, and the telephone device when the constant contact is lost;

retrieve an evacuation destination from emergency messages broadcast by the security control module;

generate an evacuation route according to the current location of the mobile device and the evacuation destination; and display the evacuation route on the mobile device;

wherein the secure area comprises a plurality of sub-areas, and each of the sub-areas is designated to have one of a plurality of area designation security levels;

wherein the at least one authorized accessible area for the mobile device comprises a plurality of the sub-areas; and wherein for at least one of the sub-areas, each of the plurality of user designation levels corresponds to different security changes in the area designation security level of the sub-area, and at least one user designation level corresponds to different security changes in different sub-areas having different area designation security levels.

16. The method of claim 15, wherein:

the information of the at least one authorized accessible area for the mobile device comprises the area designation security level of each of the sub-areas of the at least one authorized accessible area; and the mobile device security application is configured to determine that, based on the comparison of the current location of the mobile device with the user designation level of the mobile device and the information of the at least one authorized accessible area for the mobile device of the security policy, the mobile device requires the security change to the one or more functions on the mobile device when the current location of the mobile device is outside of the at least one authorized accessible area, or when the current location of the mobile device crosses a border between two of the sub-areas having different area designation security levels.

* * * * *